United States Patent Office 3,487,714
Patented Jan. 6, 1970

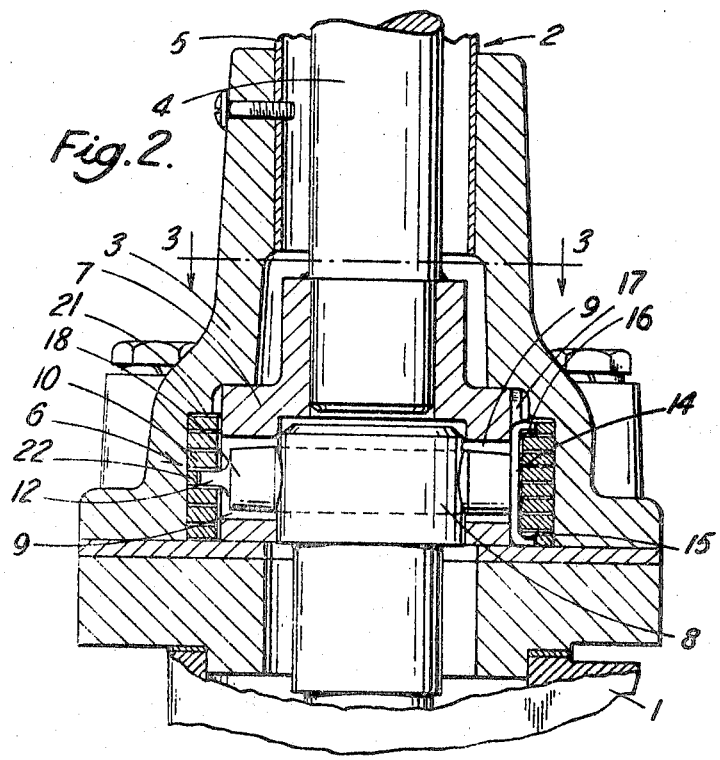
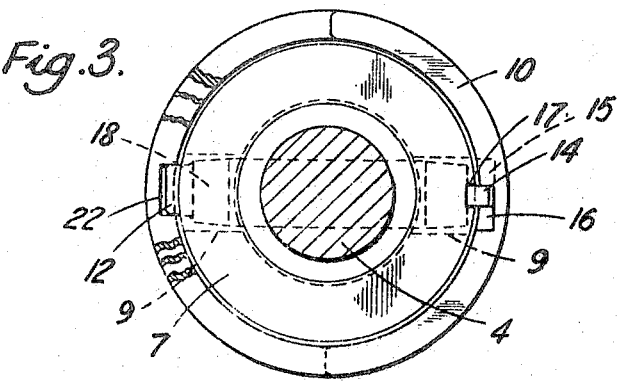

3,487,714
VEHICLE STEERING MECHANISMS
Ronald Goodacre, Basingstoke, England, assignor to Lansing Bagnall Limited, Basingstoke, Hampshire, England, a British company
Filed Dec. 12, 1967, Ser. No. 690,004
Claims priority, application Great Britain, Dec. 14, 1966, 56,059/66
Int. Cl. B62d 1/20
U.S. Cl. 74—496                             5 Claims

ABSTRACT OF THE DISCLOSURE

A steering mechanism for at least one ground wheel of a vehicle comprises a steering column having a steering shaft carrying at one end a steering wheel and having its other end connected through steering gear to the ground wheel, there being a lost-motion connection between the said other end of the steering shaft and a member forming part of the steering gear, which connection includes a spring brake that allows rotation of the steering shaft to rotate the said part of the steering gear but prevents reverse rotation of the said part of the steering gear from rotating the steering shaft. The steering mechanism thus isolates "kick-back" from the steering column and the steering wheel.

---

This invention relates to vehicle steering mechanisms.

According to the invention a steering mechanism for at least one ground wheel of a vehicle comprises a steering column having a fixed outer tubular member and an inner steering shaft carrying at one end a steering wheel and having its other end connected through steering gear to the ground wheel or wheels, there being a lost-motion connection between the said other end of the steering shaft or a part connected thereto and a member forming part of the steering gear, which connection includes a spring brake that allows rotation of the steering shaft to rotate the said part of the steering gear but prevents reverse rotation of the said part of the steering gear from rotating the steering shaft. The steering mechanism thus isolates "kick-back" from the steering column and the steering wheel.

In one form of the invention the spring brake of the lost-motion connection between the steering shaft or a part connected thereto and the said member forming part of the steering gear comprises a coil spring which is engaged at or adjacent each end by one part (e.g. the steering shaft) and the centre of the spring is engaged by the other part (e.g. the said member forming part of the steering gear), and the spring is held within a fixed housing and is normally free to rotate therein, the arrangement being such that on relative movement between the two parts by rotation of the steering shaft, the spring remains free in the housing, whereas in the event of kickback from the steering gear, one half (depending on the direction of kick-back rotation) of the spring is expanded into self-increasing gripping engagement with the housing whereby the steering gear becomes locked against further rotation.

Preferably the lost-motion connection is provided by a clearance between the steering shaft, or a part connected thereto, and a transverse driving pin passing through a spigot or other member forming part of the steering gear. One end of the pin may engage the centre of the spring, and the spring may be engaged adjacent each end by the steering shaft, or a part connected thereto.

The invention also includes a vehicle, e.g. an industrial truck, having a steering mechanism as described above.

By way of example, a specific embodiment in accordance with the invention will now be described with reference to the accompanying drawings in which:

FIGURE 2 is an enlarged view of a part of the mechanism shown in FIGURE 1; and

FIGURE 3 is a section along line 3—3 in FIGURE 2, the spring of the spring clutch being partly broken away and the housing encasing the lower end of the steering column being removed.

Figure 1:
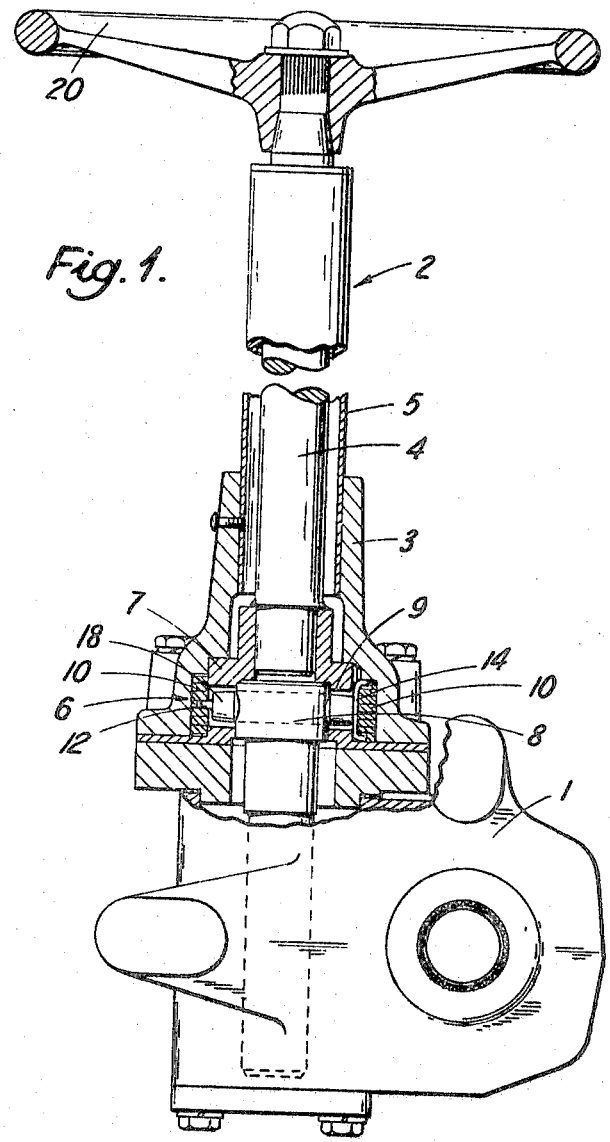
FIGURE 1 is a part-sectional elevation of a vehicle steering mechanism.

With reference to the drawings, an industrial truck is provided with steering gear for controlling the movements of one or more steerable ground wheels. This steering gear includes a reduction box 1, the mechanism of which is operated by a steering column 2 which has its lower end encased within a housing 3 rigidly secured to the reduction box. The upper end of the steering column is provided with a steering wheel 20 fixed to a steering shaft 4 for rotation by the operator of the truck and the steering shaft is surrounded by a stationary outer tube 5. Between the lower end of the steering column and the mechanism in the reduction box, and located within the housing secured to the reduction box there is a spring brake 6 (as described below) which automatically disengages from the housing 3 when the steering wheel is turned in either direction and which automatically engages the housing when the steering gear receives a reverse shock or "kick-back" which can occur when the ground wheel or wheels being steered hits an obstruction. The object of the spring clutch is to prevent or reduce the effects of the "kick-back" being felt by the operator of the truck.

The construction of the spring clutch will now be described. The clutch comprises a coupling between the lower end of the steering shaft 4 and a spigot 8 projecting upwardly through an aperture in the top of the reduction box, the upper end of the spigot being concentric with the steering shaft and located within the said housing 3 secured to the reduction box. Rigidly secured to the lower end of the steering shaft, there is a collar 7 which projects towards the said spigot and provides a socket therefor. The spigot and collar are connected by a pin 18 which passes transversely through the spigot and at least projects into diametrically opposed holes 9 in the collar, the holes in the collar being clearance holes to allow a small degree of lost-motion between the collar, and hence the steering shaft, and the spigot on rotation of the steering shaft or on rotation of the spigot during "kick-back."

Surrounding the collar, there is a close-coil coil spring 10. The spring is a close fit within a recess 21 in the housing 3. Within the wall of the spring and at a point half-way along its length, there is a recess 22 for engagement by a tang 12 projecting from one end of the pin 18. Opposite the other end of the pin there is a C-shaped clamp 14 in engagement in further recesses 15, 16 in the spring adjacent each end of the spring, the said further recesses being diametrically opposed to the said recess 22 engaged by the tang 12. The C-shaped clamp 14 is keyed to a groove 17 in the outside surface of the collar 7.

The spring 10 is movable between an expanded condition in which the spring engages and grips the inner surface of the recess 21 in the housing 3 and a released condition in which the spring is free in the recess for rotation therein. The arrangement is that movement of the C-clamp 14 in either direction by rotation of the steering wheel 20 maintains the spring in the released condition, whereas rotation of the transverse pin 18 (by kick-back) to take up the lost-motion rotates the centre of the spring relative to the ends (held by the C-clamp which in turn is held by the steering wheel) and expands one half of the spring into self-increasing gripping engagement with the inner surface of the recess.

I claim:

1. A steering mechanism for at least one ground wheel of a vehicle which mechanism comprises a steering column having a fixed outer tubular member and an inner steering shaft carrying at one end a steering wheel and having its other end connected through steering gear adapted to be connected to the ground wheel, there being a lost motion connection between the said other end of the steering shaft and a member forming part of the steering gear, which connection comprises a coil spring which is operatively engaged at each end by one of said steering shaft and steering gear member and the centre of the spring is engaged by the other of said steering shaft and steering gear member, and in which the spring is held within a fixed housing on the tubular member and is normally free to rotate therein, the arrangement being such that on relative movement between the two by rotation of the steering shaft, the spring remains free in the housing whereas in the event of kick-back from the steering gear, one half of the spring is expanded into self-increasing gripping engagement with the housing whereby the steering gear becomes locked against further rotation.

2. A steering mechanism as claimed in claim 1 in which the lost-motion connection is provided by a clearance between the steering shaft and a transverse driving pin passing through a spigot forming part of the steering gear.

3. A steering mechanism as claimed in claim 2 in which one end of the pin engages the centre of the spring and in which each end of the spring is operatively engaged by the steering shaft.

4. A steering mechanism as claimed in claim 2 in which one end of the pin engages the centre of the spring and in which each end of the spring is engaged by a collar operatively rigidly connected to the said other end of the steering shaft.

5. A steering mechanism as claimed in claim 4 in which at least one end of the pin passes into a clearance hole in the said collar, the said clearance between the hole and the pin comprising the lost-motion connection between the steering shaft and the said pin.

References Cited

UNITED STATES PATENTS

| 1,349,415 | 8/1920 | Dyer | 74—496 |
| 1,440,666 | 1/1923 | Flora et al. | 74—496 |
| 2,883,878 | 4/1959 | Landgreen | 74—496 |

MILTON KAUFMAN, Primary Examiner